United States Patent
Iizuka

(10) Patent No.: US 10,479,301 B2
(45) Date of Patent: Nov. 19, 2019

(54) JOINT STRUCTURE OF A BUMPER REINFORCEMENT AND A SIDE MEMBER

(71) Applicant: TOYOTA JIDOSHA KABUSHIKI KAISHA, Toyota-shi (JP)

(72) Inventor: Hiroharu Iizuka, Aichi-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/728,672

(22) Filed: Oct. 10, 2017

(65) Prior Publication Data

US 2018/0105128 A1  Apr. 19, 2018

(30) Foreign Application Priority Data

Oct. 14, 2016  (JP) .................... 2016-202930

(51) Int. Cl.
| | |
|---|---|
| *B60R 19/00* | (2006.01) |
| *B60R 19/18* | (2006.01) |
| *B60R 19/24* | (2006.01) |
| *B60R 19/02* | (2006.01) |

(52) U.S. Cl.
CPC .......... *B60R 19/023* (2013.01); *B60R 19/18* (2013.01); *B60R 19/24* (2013.01)

(58) Field of Classification Search
CPC ......... B60R 19/24; B60R 19/26; B60R 19/28; B60R 19/34; B60R 2019/247; B60R 19/18; B60R 19/023
USPC ....................................................... 293/102
See application file for complete search history.

(56) References Cited

U.S. PATENT DOCUMENTS

| | | | | |
|---|---|---|---|---|
| 2,186,137 A | * | 1/1940 | Halladay | B60R 19/28 293/137 |
| 5,080,412 A | * | 1/1992 | Stewart | B60R 19/03 293/120 |
| 6,042,163 A | * | 3/2000 | Reiffer | B60R 19/18 293/102 |
| 2008/0203740 A1 | * | 8/2008 | Mellis | B60R 19/18 293/102 |
| 2014/0091595 A1 | * | 4/2014 | Ramoutar | B60R 19/24 296/187.09 |

(Continued)

FOREIGN PATENT DOCUMENTS

| | | |
|---|---|---|
| JP | 57-161544 U | 10/1982 |
| JP | 2-45887 U | 3/1990 |
| JP | 2012-236547 | 12/2012 |

*Primary Examiner* — Gregory A Blankenship
(74) *Attorney, Agent, or Firm* — Oblon, McClelland, Maier & Neustadt, L.L.P.

(57) ABSTRACT

A joint structure of a bumper reinforcement and a side member, the joint structure comprising: a bumper reinforcement that is provided at a vehicle front-rear direction end portion of a vehicle so as to extend in a vehicle width direction, and that includes: a vertical wall and a pair of horizontal walls; a left and right pair of side members that are respectively provided at the vehicle inner side of the bumper reinforcement so as to extend in the vehicle front-rear direction with leading ends of the side members fastened to the vertical wall of the bumper reinforcement; and fastening extensions that are provided at the respective leading ends of the side members, that project out toward a vehicle width direction outer side with respect to a respective side member, and that are fastened to at least one of the horizontal walls of the bumper reinforcement.

10 Claims, 10 Drawing Sheets

(56) References Cited

U.S. PATENT DOCUMENTS

| | | |
|---|---|---|
| 2014/0103670 A1 | 4/2014 | Iijima et al. |
| 2015/0232050 A1* | 8/2015 | Yamada .................. B60R 19/34 296/187.1 |
| 2015/0291114 A1* | 10/2015 | Borde .................. B60R 19/023 293/122 |
| 2016/0144813 A1* | 5/2016 | Clauser .................. B60R 19/24 293/133 |
| 2016/0144814 A1* | 5/2016 | Ahn ........................ B23K 9/16 293/133 |
| 2016/0264081 A1* | 9/2016 | Kibben .................. B60R 19/12 |
| 2016/0280167 A1* | 9/2016 | Kaneko .................. B60R 19/34 |
| 2017/0113735 A1* | 4/2017 | Kawabe ................. B62D 25/08 |
| 2018/0105128 A1* | 4/2018 | Iizuka .................. B60R 19/023 |
| 2018/0170294 A1* | 6/2018 | Hashimoto ............. B60R 19/34 |
| 2018/0244225 A1* | 8/2018 | Nakayama ............. B60K 11/04 |
| 2018/0257589 A1* | 9/2018 | Kawamura ............. B60R 19/34 |

\* cited by examiner

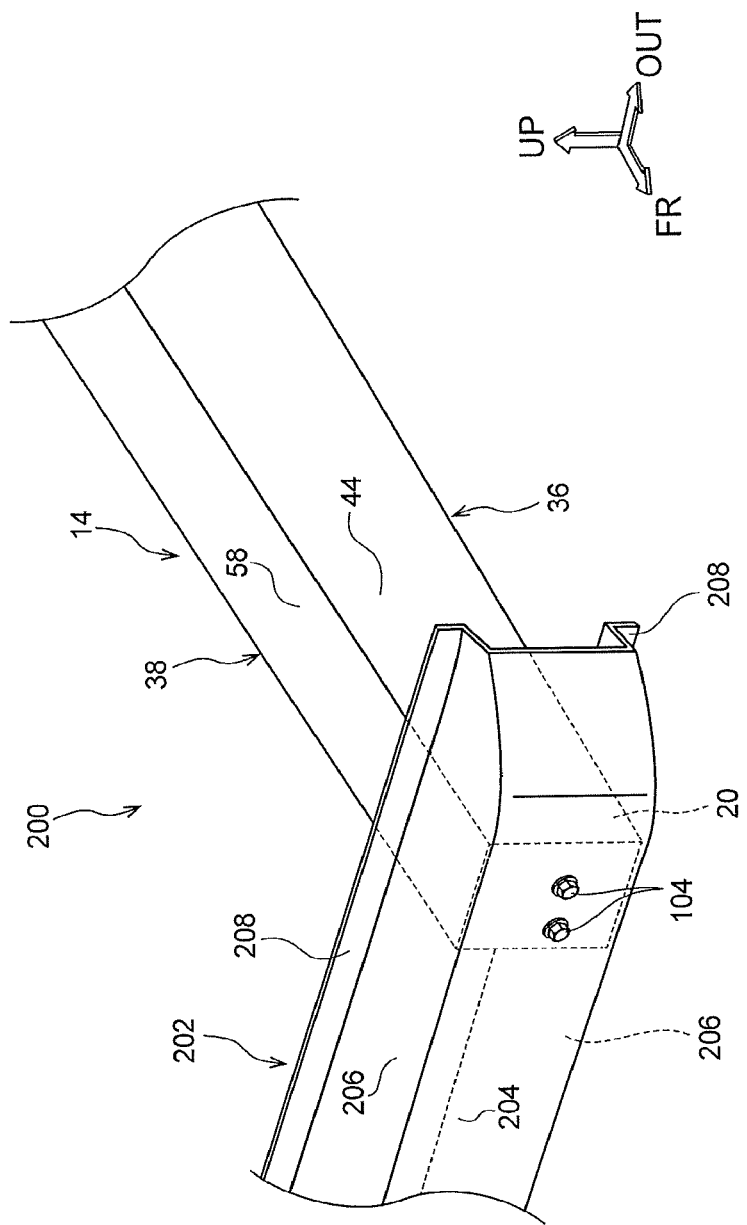

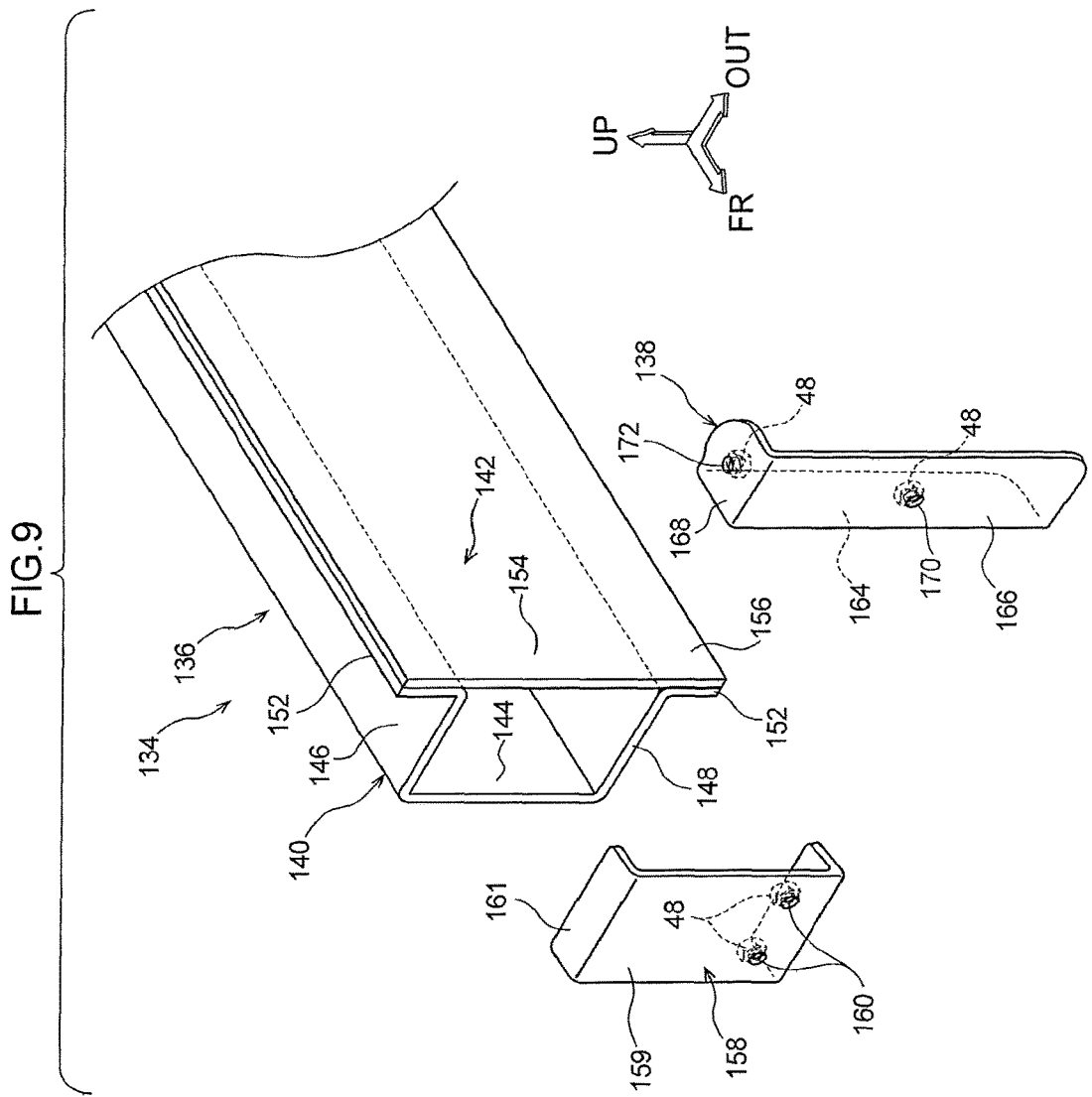

JOINT STRUCTURE OF A BUMPER REINFORCEMENT AND A SIDE MEMBER

CROSS-REFERENCE TO RELATED APPLICATION

This application is based on and claims priority under 35 USC 119 from Japanese Patent Application No. 2016-202930 filed on Oct. 14, 2016, the disclosure of which is incorporated by reference herein.

BACKGROUND

Technical Field

The present disclosure is related to a joint structure of a bumper reinforcement and a side member.

Related Art

Japanese Patent Application Laid-Open (JP-A) No. 2012-236547 describes a vehicle body structure. This vehicle body structure is provided with bumper reinforcement extending along a vehicle width direction, a front side member extending along a vehicle front-rear direction, and a bumper stay provided at a lead end of the front side member.

A front wall of the bumper stay is fastened to a front wall of the bumper reinforcement. Collision load inputted to the bumper reinforcement is accordingly transmitted to the front side member.

However, in the configuration described in JP-A No. 2012-236547, the bumper reinforcement is formed with a cross-section profile orthogonal to a bumper reinforcement length direction that is substantially a hat-shape open toward the vehicle inner side. Thus, when collision load is input to the bumper reinforcement, a pair of vehicle vertical direction walls of the bumper reinforcement deform so as to open in a direction to separate from each other, and it is possible that bending rigidity of the bumper reinforcement is reduced such that collision load cannot be sufficiently transmitted to the side member.

On the other hand, it is conceivable to increase the number of points where the bumper reinforcement is fastened to the front side member in order to suppress deformation in the pair of walls of the bumper reinforcement. However, an increased number of fastening points hinders compression deformation of the front side member, and there is a possibility that collision load cannot be absorbed as intended. Accordingly, the above related art has room for improvement regarding these points.

SUMMARY

In consideration of the above circumstances, an object of the present disclosure is to obtain a joint structure of a bumper reinforcement and a side member that is capable of efficiently transmitting, to the side member, collision load inputted to the bumper reinforcement without hindering any compression deformation in the side member.

A joint structure of the bumper reinforcement and the side member according to a first aspect is a joint structure including bumper reinforcement, a left and right pair of side members, and fastening extensions. The bumper reinforcement is provided at a vehicle front-rear direction end portion of a vehicle so as to extend in a vehicle width direction. The bumper reinforcement includes a vertical wall disposed with a plate thickness direction in the vehicle front-rear direction, and a pair of horizontal walls provided respectively extending from both vehicle vertical direction end portions of the vertical wall toward a vehicle inner side substantially along the vehicle front-rear direction. The left and right pair of side members are respectively provided at the vehicle inner side of the bumper reinforcement so as to extend in the vehicle front-rear direction with leading ends of the side members fastened to the vertical wall of the bumper reinforcement. The fastening extensions are provided at the respective leading ends of the side members, project out toward a vehicle width direction outer side with respect to a respective side member, and are fastened to at least one of the horizontal walls of the bumper reinforcement.

According to the first aspect, the bumper reinforcement provided to at least one out of a vehicle front section or a vehicle rear section of a vehicle is configured including the vertical wall and the pair of horizontal walls. The side members are respectively provided at the vehicle inner side of the bumper reinforcement. The side members are fastened to the vertical wall of the bumper reinforcement.

The side members include the fastening extensions. The fastening extensions are provided at the respective leading ends of the side members, project out toward the vehicle width direction outer side with respect to the respective side member, and are fastened to at least one of the horizontal walls of the bumper reinforcement. Namely, in addition to the vertical wall, the horizontal wall of the bumper reinforcement is also joined to the side member. Accordingly, in cases in which collision load has been input to the bumper reinforcement, the horizontal walls of the bumper reinforcement are suppressed from deforming in a direction to separate from each other. Any reduction in bending rigidity of the horizontal walls, and hence also in the bumper reinforcement, with respect to the input collision load is thereby suppressed, enabling the collision load to be efficiently transmitted to the side members. Namely, suppressing the horizontal walls from deforming so as to open enables the bending rigidity of the horizontal walls to be utilized, and so any reduction in bending rigidity in the bumper reinforcement can be suppressed, enabling a commensurate increase in the collision load transmitted to the side member. Namely, suppressing the horizontal walls from deforming so as to open enables the bending rigidity of the horizontal walls to be utilized, and so any reduction in bending rigidity in the bumper reinforcement can be suppressed, enabling a commensurate increase in the collision load transmitted to the side member.

The respective fastening extension of each side member projects out toward the vehicle width direction outer side with respect to the respective side member, and so a fastening portion between the fastening extension of the side member and the horizontal wall of the bumper reinforcement is provided at a position not overlapping with the side member in vehicle front view. Namely, there is no direct fastening portion provided to a side wall of the side member that undergoes compression deformation in the vehicle front-rear direction when input with collision load. When the side member undergoes compression deformation in the vehicle front-rear direction due to transmission of the collision load from the bumper reinforcement to the side member, the fastening portions can accordingly be suppressed from hindering any compression deformation in the side member.

Note that side member encompasses both structures that are provided with a shock absorbing member (crash box) at a leading end of a side member, and structures that are not provided with a crash box. Leading end means a vehicle outer end in the extension direction.

In a joint structure of the bumper reinforcement and the side member according to a second aspect, the left and right pair of side members each have a cross-section profile orthogonal to a side member length direction that is a closed cross-section formed by a side member outer panel disposed at the vehicle width direction outer side and a side member inner panel disposed at a vehicle width direction inner side. The fastening extensions are each configured by an upper wall of the side member outer panel, and by an upper wall of the side member inner panel overlaps with the upper wall of the side member outer panel.

According to the second aspect, the left and right pair of side member each have a cross-section profile orthogonal to the side member length direction that is a closed cross-section formed by the side member outer panel and the side member inner panel. Further, fastening extensions are each configured by the upper wall of the side member outer panel and the upper wall of the side member inner panel overlaps with the upper wall of the side member outer panel. Namely, the bending rigidity of the side member and the fastening extension is higher than in cases in which the cross-section profile of the side member orthogonal to the side member length direction is an open cross-section, or cases in which the fastening extension is configured by a single wall alone. Accordingly, the collision load inputted to the bumper reinforcement can be more reliably transmitted to the side member.

In a joint structure of the bumper reinforcement and the side member according to a third aspect, a bracket including the fastening extensions is attached to respective leading ends of the side members.

According to the third aspect, the bracket including the fastening extension is attached to the leading end of each side member. Namely, the fastening extensions can be provided without modification to the side members by attaching the brackets to the leading ends of the side members. Accordingly, any reduction in bending rigidity in the bumper reinforcement when input with the collision load, and hindering of any compression deformation in the side member, can be suppressed while using a simple configuration.

In a joint structure of the bumper reinforcement and the side member according to a fourth aspect, the bumper reinforcement is divided into plural sections disposed along a bumper reinforcement length direction.

According to the fourth aspect, the bumper reinforcement is divided into plural sections disposed along the bumper reinforcement length direction, enabling optimization in terms of material, shape, and the like to satisfy different performance demands at each location of the bumper reinforcement. Accordingly, weight and cost reductions can be achieved while satisfying the performance demands.

The joint structure of the bumper reinforcement and the side member according to the first aspect has the excellent advantageous effect of enabling efficient transmission, to the side member, of collision load inputted to the bumper reinforcement, without hindering of any compression deformation in the side member. Accordingly, weight and cost reductions can be achieved while satisfying the performance demands.

The joint structure of the bumper reinforcement and the side member according to the second aspect has the excellent advantageous effect of enabling an improvement in transmission efficiency of collision load from the bumper reinforcement to the side member.

The joint structure of the bumper reinforcement and the side member according to the third aspect has the excellent advantageous effect of enabling efficient transmission, to a vehicle body, of collision load inputted to the bumper reinforcement while using a simple configuration.

The joint structure of the bumper reinforcement and the side member according to the fourth aspect has the excellent advantageous effect of enabling weight and costs reductions to be achieved.

BRIEF DESCRIPTION OF THE DRAWINGS

Exemplary embodiments of the present disclosure will be described in detail based on the following figures, wherein:

FIG. 4 is a perspective view illustrating relevant portions of a joint structure of the bumper reinforcement and the side member according to a comparative example;

FIG. 9 is an exploded perspective view illustrating relevant portions of a joint structure of the bumper reinforcement and the side member according to a third exemplary embodiment.

DETAILED DESCRIPTION

First Exemplary Embodiment

Figure 1:
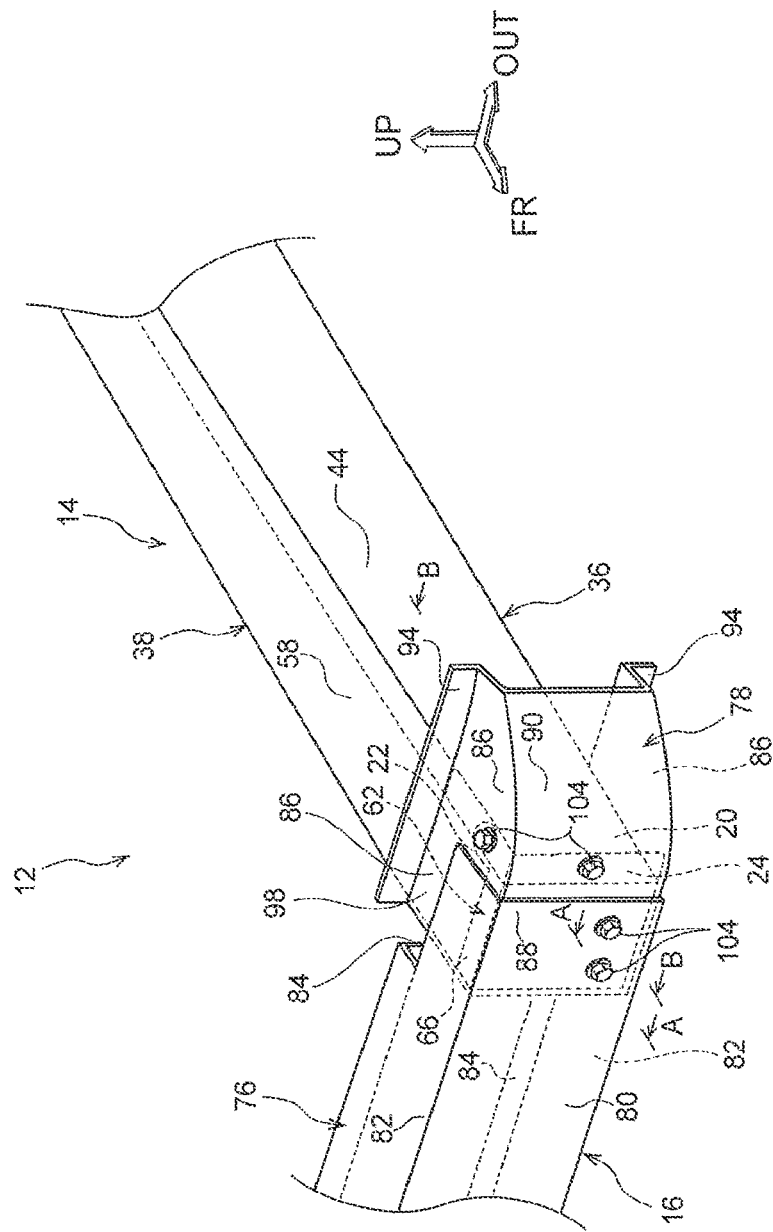
FIG. 1 is a perspective view illustrating relevant portions of a joint structure of the bumper reinforcement and the side member according to a first exemplary embodiment.
Figure 2:
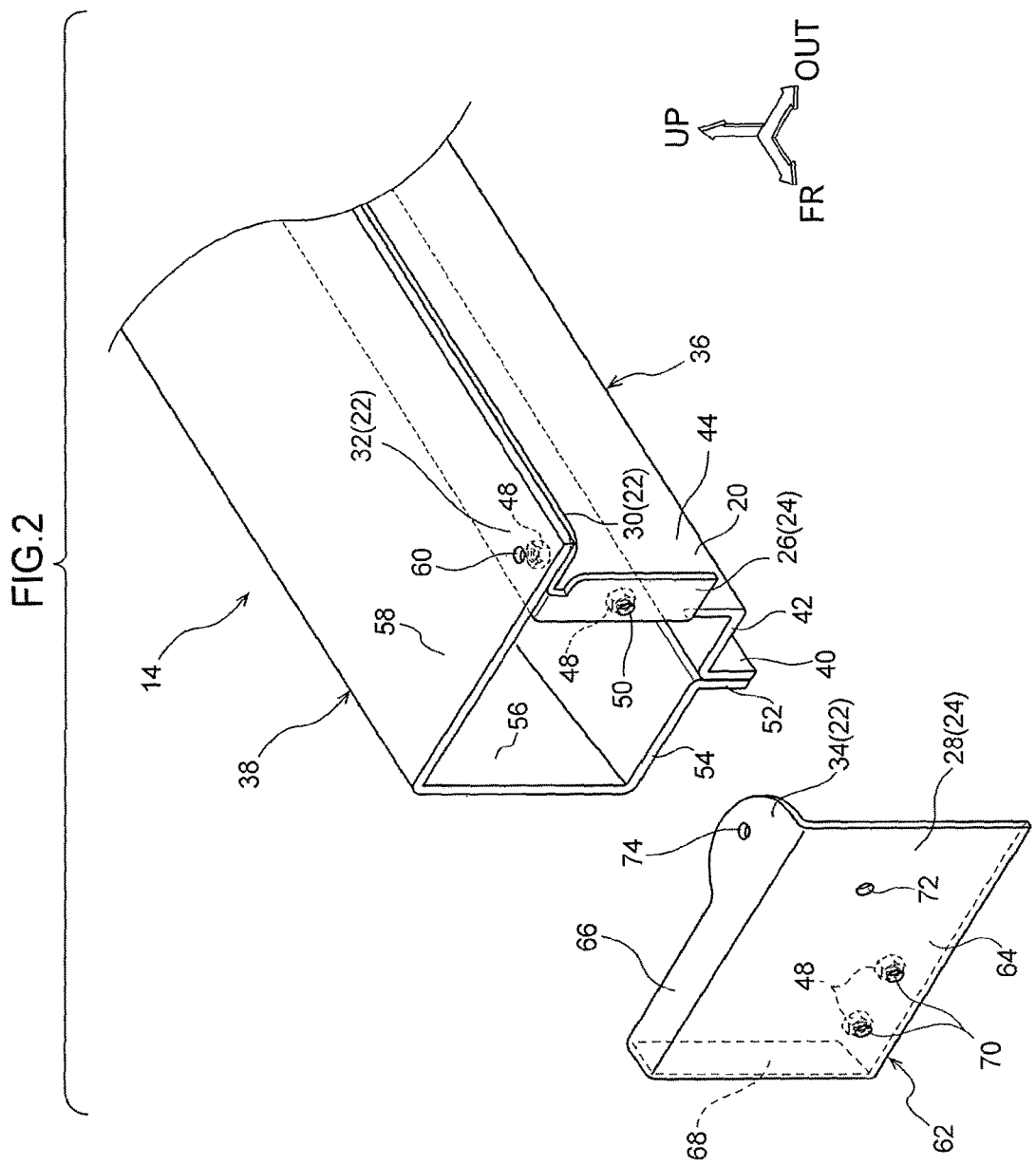
FIG. 2 is an exploded perspective view illustrating relevant portions of a joint structure of the bumper reinforcement and the side member according to the first exemplary embodiment.

Explanation follows regarding a first exemplary embodiment of a joint structure of the bumper reinforcement and the side member according to the disclosure, with reference to FIG. 1 to FIG. 3. Note that in the drawings, the arrow FR indicates the vehicle front-rear direction front side, the arrow OUT indicates the vehicle width direction outer side, and the arrow UP indicates the vehicle vertical direction upper side.

As illustrated in FIG. 1, a joint structure of the bumper reinforcement and the side member joint structure 12 provided at a front section of a vehicle is configured including a vehicle width direction pair of front side members (referred to below as the side members) 14, and a bumper reinforcement 16 provided at the vehicle front side of the side members 14. Note that the joint structure of the bumper reinforcement and the side member 12 according to the present exemplary embodiment is configured with substantially left-right symmetry (left-right symmetry with respect to a vehicle front-rear direction line running midway through the vehicle width direction). FIG. 1 accordingly illustrates one vehicle width direction side (vehicle left side) and the following explanation is explanation primarily regarding the one vehicle width direction side.

A fastening extension 22 and a front fastening extension 24 are provided to a leading end 20 of each side member 14. The front fastening extension 24 projects out from the side member 14 toward the vehicle width direction outer side and is disposed with its plate thickness direction in the vehicle front-rear direction. The front fastening extension 24 is configured including a first extension portion 26 and a second extension portion 28 (see FIG. 2), described later. Further, the fastening extension 22 projects out from the side member 14 toward the vehicle width direction outer side and is disposed with its plate thickness direction in the vehicle vertical direction. The fastening extension 22 is configured including a first upper extension configuration portion 30, a second upper extension configuration portion 32, and a third upper extension configuration portion 34 (see FIG. 2), described later.

As illustrated in FIG. 2, the side member 14 is configured including a side member outer panel 36 disposed at the vehicle width direction outer side, and a side member inner panel 38 disposed at the vehicle width direction inner side of the side member outer panel 36. The side member outer panel 36 is configured including a flange 40 provided at the vehicle lower side, a lower wall 42 provided extending from an upper end of the flange 40 toward the vehicle width direction outer side, a side wall 44 provided extending from a vehicle width direction outer end of the lower wall 42 toward the vehicle upper side, and the first upper extension configuration portion 30 provided extending from an upper end of the side wall 44 toward the vehicle width direction outer side and acting as an upper wall. A through-hole 46 is formed in a leading end of the first upper extension configuration portion 30 so as to penetrate through in a plate thickness direction thereof, and a nut 48 is attached by welding at a position corresponding to the through-hole 46, on a vehicle lower face of the first upper extension configuration portion 30 (see FIG. 3B).

The first extension portion 26 is provided at a leading end of the side wall 44 of the side member outer panel 36 so as to bend out from the side wall 44 and extend toward the vehicle width direction outer side. A through-hole 50 is formed at a substantially vehicle vertical direction center of the first extension portion 26 so as to penetrate through in a plate thickness direction thereof, and a nut 48 is attached by welding at a position corresponding to the through-hole 50, on a vehicle rear face of the first extension portion 26.

The side member inner panel 38 is configured including a flange 52 provided at the vehicle lower side, a lower wall 54 provided extending from an upper end of the flange 52 toward the vehicle width direction inner side, a side wall 56 provided extending from a vehicle width direction inner end of the lower wall 54 toward the vehicle upper side, and an upper wall 58 provided extending from an upper end of the side wall 56 toward the vehicle width direction outer end. The vehicle width direction outer side of the upper wall 58 is configured by the second upper extension configuration portion 32, and a through-hole 60 is formed in the second upper extension configuration portion 32, at a position corresponding to the through-hole 46 of the first upper extension configuration portion 30 illustrated in FIG. 3B.

The flange 40 of the side member outer panel 36 and the flange 52 of the side member inner panel 38 are joined together. The first upper extension configuration portion 30 of the side member outer panel 36 and the second upper extension configuration portion 32 of the side member inner panel 38 are joined together. A cross-section profile of the side member 14 orthogonal the side member 14 length direction is thus a closed cross-section.

A cap member 62 is attached to the leading end 20 of the side member 14. The cap member 62 is configured including a front wall 64 that is disposed with its plate thickness direction in the vehicle front-rear direction, an upper bent wall 66 that is provided extending from an upper end of the front wall 64 toward the vehicle rear and that is joined to a vehicle upper face of the upper wall 58 of the side member outer panel 36, and a side portion bent wall 68 that is provided extending from a vehicle width direction inner end of the front wall 64 toward the vehicle rear and that is joined to a vehicle width direction inner side face of the side wall 56 of the side member outer panel 36. At positions corresponding to an opening of the side member 14, plural (two in the present exemplary embodiment) through-holes 70 are formed in the front wall 64 so as to penetrate through in a plate thickness direction thereof. Nuts 48 are attached by welding at positions corresponding to the through-holes 70, on a vehicle rear face of the front wall 64.

The vehicle width direction outer side of the front wall 64 is configured by a second portion extension portion 28 that is joined to the first extension portion 26 of the side member outer panel 36. A through-hole 72 disposed at a position corresponding to the through-hole 50 is formed in the second portion extension portion 28 so as to penetrate through in a thickness direction thereof.

The vehicle width direction outer side of the upper bent wall 66 is configured by the third upper extension configuration portion 34 that is joined to the second upper extension configuration portion 32 of the side member inner panel 38. A through-hole 74 is formed at a position corresponding to the through-hole 60 so as to penetrate through the third upper extension configuration portion 34 in a thickness direction thereof.

As illustrated in FIG. 1, the bumper reinforcement 16 is configured including a first bumper reinforcement 76 and a second bumper reinforcement 78. The first bumper reinforcement 76 is, for example, configured by an extruded member made of aluminum alloy. The first bumper reinforcement 76 extends along the vehicle width direction and is formed with a substantially C-shaped open cross-section profile that is configured by a vertical wall 80 along the vehicle vertical direction, a pair of horizontal walls 82 respectively provided extending from both vehicle vertical direction ends of the vertical wall 80 toward the vehicle rear, and flanges 84 provided extending from vehicle rear ends of the horizontal walls 82 so as to approach each other along the vehicle vertical direction.

The first bumper reinforcement 76 is provided in the vehicle width direction middle and also extends to a position corresponding to the side wall 44 at the vehicle width direction outer side of the side member 14. A vehicle width direction end 88 of the first bumper reinforcement 76 abuts a vertical wall 90 of the second bumper reinforcement 78, described later.

The second bumper reinforcement 78 is, for example, manufactured from sheet steel. The second bumper reinforcement 78 extends along the vehicle width direction and is formed with a substantially hat-shaped open cross-section profile that is configured by the vertical wall 90 along the vehicle vertical direction, a pair of horizontal walls 86 provided extending from both vehicle vertical direction ends of the vertical wall 90 toward the vehicle rear, and flanges 94 provided extending from vehicle rear ends of the horizontal walls 86 so as to separate from each other along the vehicle vertical direction.

Figure 3A:
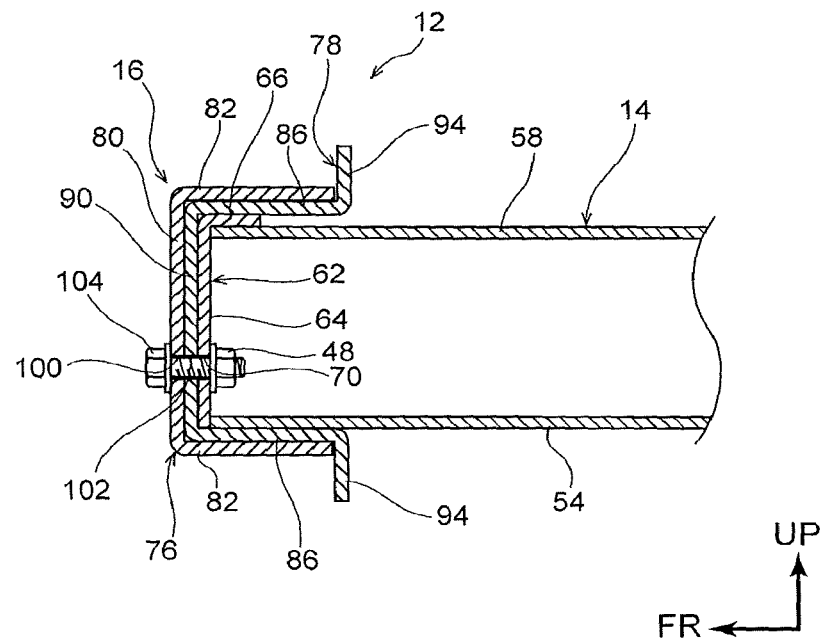
FIG. 3A is a vertical cross-section illustrating a state taken along line A-A in FIG. 1.

As illustrated in FIG. 3A, the second bumper reinforcement 78 abuts the cap member 62 of the side member 14, and a vehicle width direction inner end 98 of the second bumper reinforcement 78 is provided extending to a position corresponding to the side wall 56 (see FIG. 2) of the side member 14 (see FIG. 1).

Through-holes 100, 102 are respectively formed in the vertical wall 80 of the first bumper reinforcement 76 and the vertical wall 90 of the second bumper reinforcement 78 at overlapping positions thereof so as to penetrate through in their respective plate thickness directions. Bolts 104 are inserted into the through-holes 100, 102 and into the through-holes 70 of the cap member 62 of the side member 14, and the bolts 104 are screwed into the nuts 48.

Figure 3B:
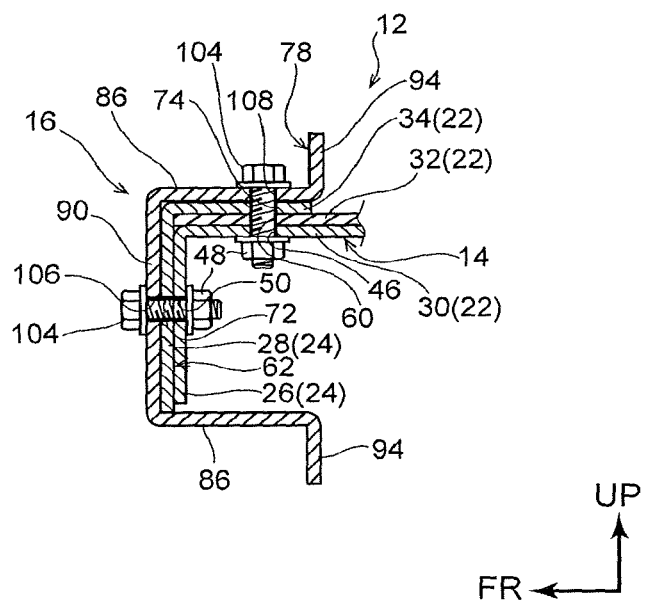
FIG. 3B is a vertical cross-section illustrating a state taken along line B-B in FIG. 1.

As illustrated in FIG. 3B, through-holes 106, 108 are provided at a substantially vehicle width direction center of the respective vertical wall 90 and the horizontal wall 86 at the vehicle upper side of the second bumper reinforcement 78 so as to penetrate through in their respective plate thickness directions. A bolt 104 is inserted into the through-hole 106 and into the through-holes 50, 72 in the front fastening extension 24 of the side member 14, and this bolt 104 is screwed into a nut 48. Further, a bolt 104 is inserted into the through-hole 108 and into the through-holes 46, 60, and 74 in the fastening extension 22 of the side member 14, and this bolt 104 is screwed into a nut 48. The first bumper reinforcement 76 and the second bumper reinforcement 78 are fastened to the side member 14 by fastening as described above.

Operation and Advantageous Effects of First Exemplary Embodiment

Explanation follows regarding operation and advantageous effects of the present exemplary embodiment.

Figure 5A:
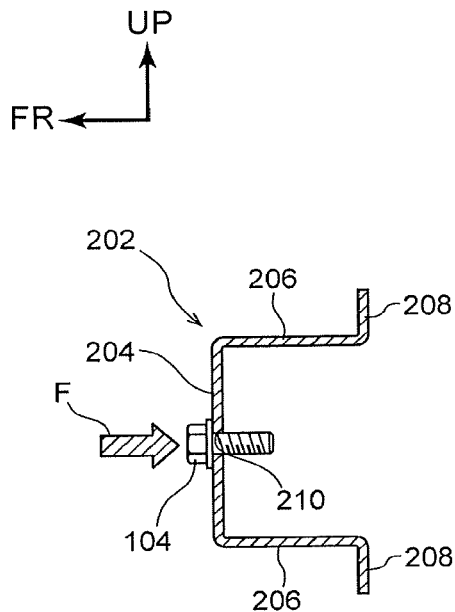
FIG. 5A is a vertical cross-section illustrating joint structure of the bumper reinforcement and the side member according to a comparative example, in a state before collision load has been inputted to the bumper reinforcement.

Note that explanation follows regarding operation and advantageous effects of the present exemplary embodiment with reference to the comparative example illustrated in FIG. 4 to FIG. 6. Note that configuration portions that are the same as those in the present exemplary embodiment are appended with the same reference numerals, and explanation thereof is omitted.

As illustrated in FIG. 4, a joint structure of the bumper reinforcement and the side member 200 is configured including a side member 14 and bumper reinforcement 202. The bumper reinforcement 202 is, for example, manufactured from sheet steel, extends in the vehicle width direction, and is formed with a substantially hat-shaped open cross-section profile configured by a vertical wall 204 along the vehicle vertical direction, a pair of horizontal walls 206 respectively provided extending from both vehicle vertical direction ends of the vertical wall 204 toward the vehicle rear, and flanges 208 provided extending from vehicle rear ends of the horizontal walls 206 so as to separate from each other along the vehicle vertical direction. Note that for convenience during molding, the pair of horizontal walls 206 are inclined at an angle so as to separate from each other on progression toward the vehicle rear (not illustrated in the drawings).

Through-holes 210 (see FIG. 5A) are formed in the vertical wall 204 of the bumper reinforcement 202 so as to penetrate through in a plate thickness direction of the vertical wall 204. Bolts 104 are inserted into the through-holes 210 of the vertical wall 204 and into through-holes 70 of the cap member 62 of the side member 14 illustrated in FIG. 3A, and these bolts 104 are screwed into nuts 48. The bumper reinforcement 202 is thus fastened to the side member 14.

Figure 5B:
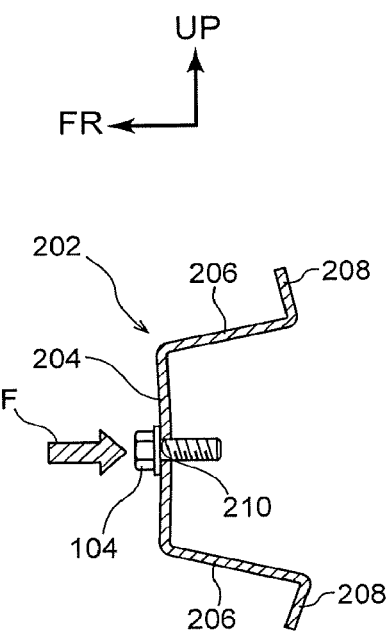
FIG. 5B is a vertical cross-section illustrating an initial state when collision load has been inputted with respect to FIG. 5A.
Figure 5C:
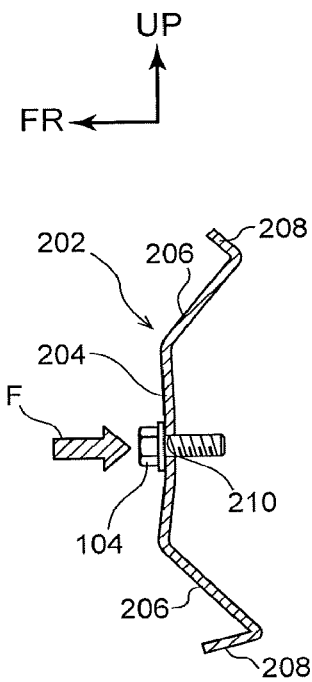
FIG. 5C is a vertical cross-section illustrating a latter state with respect to FIG. 5B.

When collision load F from the vehicle front is input to the bumper reinforcement 202, the bumper reinforcement 202 bears the collision load F primarily at ridge lines between the vertical wall 204 and the horizontal walls 206. When this occurs, due to the pair of horizontal walls 206 being bent in a direction to separate from each other on progression toward the vehicle rear, as illustrated in FIG. 5B, the horizontal walls 206 of the bumper reinforcement 202 begin to deform so as to separate from each other. As bearing of the collision load F progresses, as illustrated in FIG. 5C, the bumper reinforcement 202 undergoes cross-sectional deformation such that the horizontal walls 206 separate greatly from each other. This cross-sectional deformation reduces the bending rigidity of the horizontal walls 206 with respect to the collision load F input from the vehicle front, and there is a possibility that the collision load F cannot be sufficiently transmitted to the side member 14.

Figure 6A:
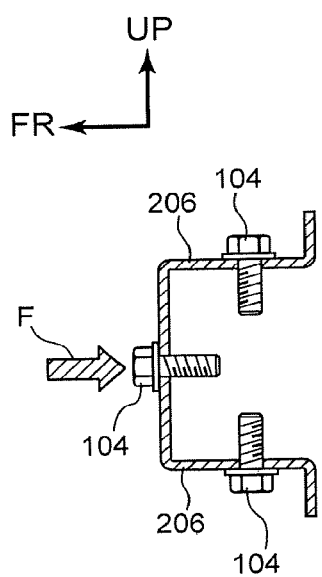
FIG. 6A is a vertical cross-section illustrating a joint structure of the bumper reinforcement and the side member according to another comparative example, in a state before collision load has been inputted to the bumper reinforcement.
Figure 6B:
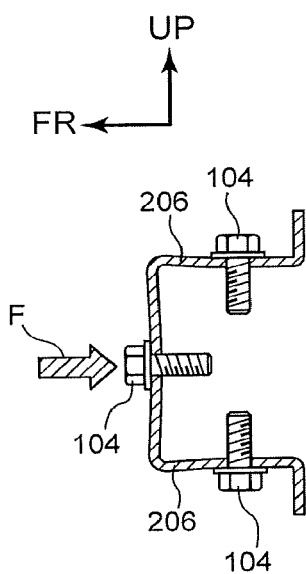
FIG. 6B is a vertical cross-section illustrating an initial state when collision load has been inputted with respect to FIG. 6A.
Figure 6C:
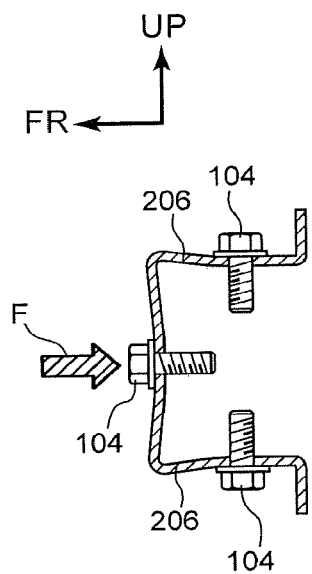
FIG. 6C is a vertical cross-section illustrating a latter state with respect to FIG. 6B.

However, as illustrated in FIG. 6A, in order to suppress cross-sectional deformation in the bumper reinforcement 202, it is conceivable to fasten each of the horizontal walls 206 to the side member 14 (not illustrated in FIG. 6) using bolts 104 and non-illustrated nuts. In such a case, as illustrated in FIG. 6B and FIG. 6C, due to being able to suppress the horizontal walls 206 from deforming so as to separate from each other, any reduction in bending rigidity of the horizontal walls 206 with respect to the collision load F input from the vehicle front can be suppressed, enabling the collision load F to be sufficiently transmitted to the side member 14. However, due to providing fastening portions configured by the bolts 104 and nuts 48 to the upper wall 58 and the lower wall 42 of the side member 14 bearing the collision load F from the bumper reinforcement 202 and undergoing compression deformation, it is possible for compression deformation in the side member 14 to be hindered such that the collision load F cannot be absorbed as intended.

In contrast thereto, as illustrated in FIG. 1, in the present exemplary embodiment, the side member 14 includes the fastening extension 22 provided at the leading end 20 of the side member 14, and projecting out from the side member 14 toward the vehicle width direction outer side, and fastened to at least one out of the horizontal walls 86 of the bumper reinforcement 16. Namely, the bumper reinforcement 16 is joined to the side member 14 not only at the vertical walls 80, 90 but also at horizontal walls 86. Accordingly, in cases in which the collision load F is input to the bumper reinforcement 16, the horizontal walls 86 of the bumper reinforcement 16 are suppressed from deforming in a direction to separate from each other, and so any reduction in bending rigidity of the horizontal walls 86, and hence also in the bumper reinforcement 16, with respect to the input collision load F is suppressed, enabling the collision load F to be efficiently transmitted to the side member 14. Namely, suppressing the horizontal walls 86 from deforming so as to open out enables the bending rigidity of the horizontal walls 86 to be utilized, and so any reduction in bending rigidity in the bumper reinforcement 16 can be suppressed, enabling a commensurate increase in the collision load transmitted to the side member 14.

As illustrated in FIG. 2, the fastening extension 22 of the side member 14 projects out from the side member 14 toward the vehicle width direction outer side. Accordingly, the fastening portion between the fastening extension 22 of the side member 14 and the horizontal wall 86 of the bumper reinforcement 16 is provided at a position not overlapping with the side member 14 in vehicle front view. Namely, there is no direct fastening portion provided to the upper wall 58 of the side member 14 that undergoes compression deformation in the vehicle front-rear direction when input with collision load. The fastening portions can accordingly be suppressed from hindering compression deformation when the side member 14 undergoes compression deformation in the vehicle front-rear direction due to the collision load F being transmitted from the bumper reinforcement 16 to the side member 14. The collision load F inputted to the bumper reinforcement 16 can accordingly be efficiently transmitted to the side member 14 without hindering any compression deformation in the side member 14.

Moreover, the left and right pair of side member 14 each have a cross-section profile orthogonal to the side member 14 length direction that is a closed cross-section configured by the side member outer panel 36 and the side member inner panel 38. The fastening extension 22 is configured by the first upper extension configuration portion 30 of the side member outer panel 36 and by the second upper extension configuration portion 32 configuring part of the upper wall 58 of the side member inner panel 38 overlapped thereon. Namely, the bending rigidity of the side member 14 and the fastening extension 22 is higher than in cases in which the cross-section profile of the side member 14 orthogonal to the side member 14 length direction is an open cross-section, or cases in which the fastening extension 22 is configured by a single wall alone. Accordingly, the collision load F inputted to the bumper reinforcement 16 can be reliably transmitted of the side member 14. This enables further improvement of transmission efficiency of the collision load F from the bumper reinforcement 16 to the side member 14.

Moreover, the bumper reinforcement 16 is configured divided in its length direction into the first bumper reinforcement 76 and the second bumper reinforcement 78, respectively configured by different materials. Accordingly, by optimizing in terms of material, shape, and the like in consideration of different performance demands at each location of the bumper reinforcement 16, weight and cost reductions can be achieved while satisfying the performance demands.

Second Exemplary Embodiment

Figure 7:
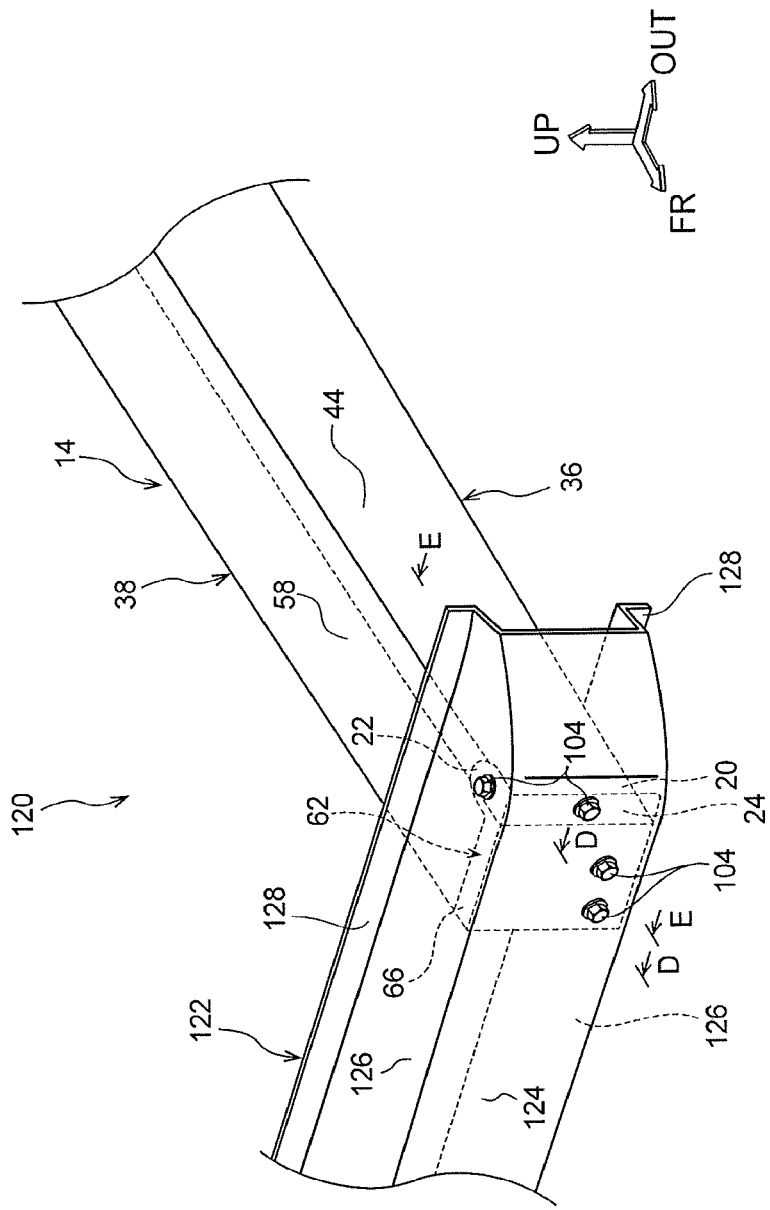
FIG. 7 is a perspective view illustrating relevant portions of a joint structure of the bumper reinforcement and the side member according to a second exemplary embodiment.

Next, explanation follows regarding a joint structure of the bumper reinforcement and the side member according to a second exemplary embodiment of the disclosure, with reference to FIG. 7 and FIG. 8. Note that configuration portions that are basically the same as those in the first exemplary embodiment are appended with the same reference numerals, and explanation thereof is omitted.

The joint structure of the bumper reinforcement and the side member 120 according to the second exemplary embodiment has the same basic configuration as that of the first exemplary embodiment except in that a bumper reinforcement 122 is configured by a single member.

Namely, as illustrated in FIG. 7, the bumper reinforcement 122 is, for example, manufactured from sheet steel, extends in the vehicle width direction, and is formed with a substantially hat-shaped open cross-section profile configured by a vertical wall 124 along the vehicle vertical direction, a pair of horizontal walls 126 respectively provided extending from both vehicle vertical direction ends of the vertical wall 124 toward the vehicle rear, and flanges 128 provided extending from vehicle rear ends of the horizontal walls 126 so as to separate from each other along the vehicle vertical direction.

Figure 8A:
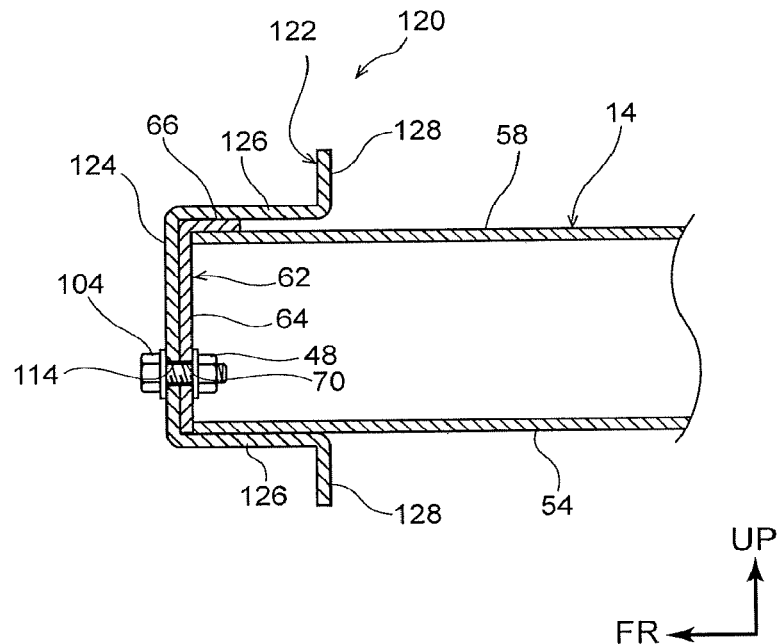
FIG. 8A is a vertical cross-section illustrating a state taken along line D-D in FIG. 7.

As illustrated in FIG. 8A, through-holes 114 are provided at positions in the vertical wall 124 corresponding to through-holes 70 of a cap member 62, bolts 104 are inserted into the through-holes 70 and into the through-holes 114, and these bolts 104 are screwed into nuts 48.

Figure 8B:
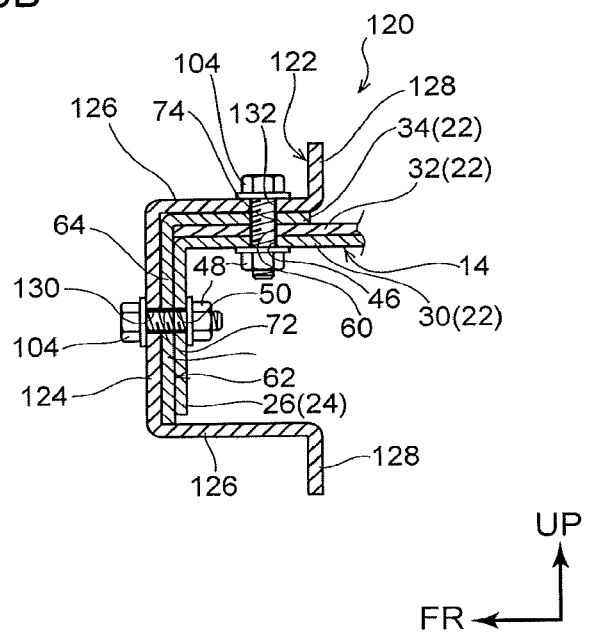
FIG. 8B is a vertical cross-section illustrating a state taken along line E-E in FIG. 7.

As illustrated in FIG. 8B, a through-hole 130 is provided in the vertical wall 124 of the bumper reinforcement 122, at a position corresponding to through-holes 50, 72 of a front fastening extension 24. Further, a through-hole 132 is provided in the horizontal wall 126 at the vehicle upper side of the bumper reinforcement 122, at a position corresponding to the through-holes 46, 60, and 74 of a fastening extension 22. A bolt 104 is inserted into the through-holes, 50, 72 and into the through-hole 130, and this bolt 104 is screwed into a nut 48. Similarly, a bolt 104 is inserted into the through-holes 46, 60, and 74 and into the through-hole 132, and this bolt 104 is screwed into a nut 48. The bumper reinforcement 122 is thus fastened to the side member 14.

Operation and Advantageous Effects of Second Exemplary Embodiment

Explanation follows regarding operation and advantageous effects of the present exemplary embodiment.

The above configuration also obtains advantageous effects similar to those of the first exemplary embodiment since configuration is similar to the joint structure of the bumper reinforcement and the side member 12 of the first exemplary embodiment other than that the bumper reinforcement 122 is configured by a single member.

Further, due to configuring the bumper reinforcement 122 using a single member, the number of manufacturing processes to attach the bumper reinforcement 122 to the side member 14 can be reduced.

Third Exemplary Embodiment

Explanation follows regarding a joint structure of the bumper reinforcement and the side member according to a third exemplary embodiment of the disclosure, with reference to FIG. 9. Note that configuration portions that are basically the same as those in the first exemplary embodiment described above are appended with the same reference numerals, and explanation thereof is omitted.

A joint structure of the bumper reinforcement and the side member 134 according to the third exemplary embodiment has the same basic configuration as that of the first exemplary embodiment, except in that a bracket 138 is provided to a side member 136.

Namely, as illustrated in FIG. 9, the side member 136 is configured including a side member inner panel 140 disposed at the vehicle width direction inner side, and a side member outer panel 142 disposed at the vehicle width direction outer side of the side member inner panel 140. The side member inner panel 140 extends along the vehicle front-rear direction and is formed with a substantially hat-shaped open cross-section profile that is configured by a side wall 144 provided along the vehicle vertical direction, an upper wall 146 and a lower wall 148 respectively extending from both vehicle vertical direction ends of the side wall 144 toward the vehicle width direction outer side, and flanges 152 that extend along the vehicle vertical direction from respective vehicle width direction outer ends of the upper wall 146 and the lower wall 148 so as to extend in a direction to separate from each other. The side member outer panel 142 is configured by a plate shaped side wall 154 with its plate thickness direction in the vehicle width direction. A vehicle upper end and a vehicle lower end of the side wall 154 are joined to the respective flanges 152 of the side member inner panel 140. The side member 136 thus forms a closed cross-section.

A cap member 158 is provided to a leading end 156 of the side member 136. The cap member 158 is disposed with its plate thickness direction in the vehicle front-rear direction and is joined to the side member 136 so as to close off an opening in the leading end 156 of the side member 136. The cap member 158 is configured including a front wall 159 disposed with its plate thickness direction in the vehicle front-rear direction, an upper bent wall 161 that is provided extending from a vehicle upper end of the front wall 159 toward the vehicle rear and that is joined to a vehicle upper face of the upper wall 146 of the side member inner panel 140, and a lower bent wall 162 that is provided extending from a vehicle lower end of the front wall 159 toward the vehicle rear and that is joined to a vehicle lower face of the lower wall 148 of the side member inner panel 140. Plural (two in the present exemplary embodiment) through-holes 160 are formed in the front wall 159 so as to penetrate through in a plate thickness direction thereof, and nuts 48 are attached to respective positions corresponding to the through-holes 160, on a vehicle rear face of the front wall 159.

A bracket 138 is provided to the leading end 156 of the side member 136. The bracket 138 is configured including an attachment wall 164, a front fastening extension 166, and a fastening extension 168. The attachment wall 164 is formed in a plate shape with its plate thickness direction in the vehicle width direction and is joined to the side wall 154 of the side member outer panel 142 from the vehicle width direction outer side thereof.

The front fastening extension 166 is provided extending from the attachment wall 164 toward the vehicle width direction outer side and is disposed with its plate thickness direction in the vehicle front-rear direction. A through-hole 170 is formed in the front fastening extension 166 so as to penetrate through in a plate thickness direction thereof. A nut 48 is attached by welding at a position corresponding to the through-hole 170, on a vehicle rear face of the front fastening extension 166.

The fastening extension 168 is provided extending from the attachment wall 164 toward the vehicle width direction outer side and is disposed with its plate thickness direction in the vehicle vertical direction. A through-hole 172 is formed in the fastening extension 168 so as to penetrate through in a plate thickness direction thereof. A nut 48 is attached by welding at a position corresponding to the through-hole 172, on a vehicle lower face of the fastening extension 168.

The bolts 104 illustrated in FIG. 3A are inserted into the through-holes 100 of the vertical wall 80 of the first bumper reinforcement 76 illustrated in FIG. 3A, into the through-holes 102 of the vertical wall 90 of the second bumper reinforcement 78 illustrated in FIG. 3A, and into the through-holes 160 of the side member 136 illustrated in FIG. 9. These bolts 104 are screwed into the nuts 48 illustrated in FIG. 3A. Further, one of the bolts 104 illustrated in FIG. 3B is inserted into the through-hole 106 of the vertical wall 90 of the second bumper reinforcement 78 illustrated in FIG. 3B and into the through-hole 170 of the front fastening extension 166 of the bracket 138 illustrated in FIG. 9. This bolt 104 is screwed into one of the nuts 48 illustrated in FIG. 3B. Moreover, the other of the bolts 104 illustrated in FIG. 3B is inserted into the through-hole 108 of the horizontal wall 86 of the second bumper reinforcement 78 illustrated in FIG. 3B and into the through-hole 172 of the fastening extension 168 of the bracket 138 illustrated in FIG. 9. This bolt 104 illustrated in FIG. 3B is screwed into the other of the nuts 48 illustrated in FIG. 3B. The first bumper reinforcement 76 and the second bumper reinforcement 78 are thus fastened to the side member 136.

Operation and Advantageous Effects of Third Exemplary Embodiment

Explanation follows regarding operation and advantageous effects of the present exemplary embodiment.

The above configuration also obtains advantageous effects similar to those of the first exemplary embodiment since configuration is similar to the joint structure of the bumper reinforcement and the side member 12 of the first exemplary embodiment, except in that the bracket 138 is provided to the side member 136.

The bracket 138 including the fastening extension 168 is attached to the leading end 156 of the side member 136. Namely, the fastening extension 168 can be provided without modification to the side member 136 by attaching the bracket 138. Accordingly, any reduction in bending rigidity in the bumper reinforcement 16 when input with the collision load F, and hindering of any compression deformation in the side member 136, can be suppressed while using a simple configuration. This enables the collision load F inputted to the bumper reinforcement 16 to be efficiently transmitted to a vehicle body using a simple configuration.

Note that in the third exemplary embodiment, configuration is made in which the separated bumper reinforcement 16 is attached to the side member 136. However, there is no limitation thereto. Configuration may be made in which the bumper reinforcement 122 configured by a single member is attached to the side member 136.

Further, the bracket 138 is configured including the front fastening extension 166 and the fastening extension 168. However, there is no limitation thereto. Configuration may be made in which only the fastening extension 168 is provided to the bracket 138.

Moreover, in the first to the third exemplary embodiments described above, configuration is made in which the bumper reinforcement 16, 122 is attached to the respective leading end 20, 156 of the side member 14, 136. However, there is no limitation thereto. Configuration may be made in which the bumper reinforcement 16, 122 is attached through a crash box (not illustrated in the drawings) provided with a fastening extension portion or the bracket 138, with the crash box being formed in a substantially rectangular tube shape configuring the leading end 20, 156 of the side member 14, 136, and disposed with its axial direction in the vehicle front-rear direction. Moreover, there is no limitation to providing a fastening extension to the crash box, and configuration may be made in which a front fastening extension 24 is provided to the crash box.

Further, the fastening extension 22 is configured joined to the horizontal wall 86, 126 at the vehicle upper side of the bumper reinforcement 16, 122. However, there is no limitation thereto. Configuration may be made in which the fastening extension 22 is provided to the bumper reinforcement 16, 122, at a position corresponding to the horizontal wall 86, 126 at the vehicle lower side, and the fastening extension 22 is joined to the horizontal wall 86, 126 at the vehicle lower side. Moreover, configuration may be made in which fastening extensions 22 are respectively provided at positions corresponding to both the horizontal wall 86, 126 at the vehicle upper side of the bumper reinforcement 16, 122, and the horizontal wall 86, 126 at the vehicle lower side thereof, with the respective fastening extensions 22 joined to both the horizontal wall 86, 126 at the vehicle upper side and the horizontal wall 86, 126 at the vehicle lower side.

Moreover, configuration is made in which the vertical wall 80, 90, 124 of the bumper reinforcement 16, 122 is respectively fastened to both the cap member 62, 158 and the front fastening extension 24, 166. However, there is no limitation thereto. Configuration may be made in which the vertical wall 80, 90, 124 is respectively fastened only to the front fastening extension 24, 166. Or the opposite configuration may be made in which the vertical wall 80, 90, 124 is respectively fastened only to the cap member 62, 158, and not to the front fastening extension 24, 166.

Further, the joint structure of the bumper reinforcement and the side member 12, 120, 134 is configured provided at a front section of a vehicle; however, there is no limitation thereto. Configuration may be made in which the joint structure of the bumper reinforcement and the side member 12, 120, 134 is joined to a rear section of a vehicle. Note that as described above, the leading end of the side member is a vehicle outer end in the extension direction, and in cases in which the present configuration is provided at the rear section of a vehicle, the leading end of the side member would be the rear end of the side member.

Explanation has been given above regarding exemplary embodiments of the disclosure. However, the disclosure is not limited thereto, and obviously various other modifications may be implemented within a range not departing from the spirit of the disclosure.

What is claimed is:

1. A joint structure of a bumper reinforcement and a side member, the joint structure comprising:
   a bumper reinforcement that is provided at a vehicle front-rear direction end portion of a vehicle so as to extend in a vehicle width direction, and that includes:
      a vertical wall disposed with a plate thickness direction in a vehicle front-rear direction, and
      a pair of horizontal walls provided respectively extending from both vehicle vertical direction end portions of the vertical wall toward a vehicle inner side, substantially along the vehicle front-rear direction;
   a left and right pair of side members that are respectively provided at the vehicle inner side of the bumper reinforcement so as to extend in the vehicle front-rear direction with leading ends of the side members fastened to the vertical wall of the bumper reinforcement; and
   fastening extensions that are provided at the respective leading ends of the side members, that project out toward a vehicle width direction outer side with respect to a respective side member, and that are fastened to at least one of the horizontal walls and to the vertical wall of the bumper reinforcement.

2. The joint structure of the bumper reinforcement and the side member of claim 1, wherein:
   the left and right pair of side members each have a cross-section profile orthogonal to a side member length direction that is a closed cross-section formed by a side member outer panel disposed at the vehicle width direction outer side and a side member inner panel disposed at a vehicle width direction inner side; and
   the fastening extensions are each configured by an upper wall of the side member outer panel, and by an upper wall of the side member inner panel that overlaps with the upper wall of the side member outer panel.

3. The joint structure of the bumper reinforcement and the side member of claim 1, wherein a bracket including the fastening extensions is attached to respective leading ends of the side members.

4. The joint structure of the bumper reinforcement and the side member of claim 1, wherein the bumper reinforcement is divided into a plurality of sections disposed along a bumper reinforcement length direction.

5. The joint structure of the bumper reinforcement and the side member of claim 3, wherein:
   the bracket comprises an attachment wall, a front fastening extension, and the fastening extension,
   the attachment wall is joined to the side members from the vehicle width direction outer side of the side members, and
   the front fastening extension is provided extending from the attachment wall toward the vehicle width direction outer side and is disposed with its plate thickness direction in the vehicle front-rear direction.

6. A joint structure of a bumper reinforcement and a side member, the joint structure comprising:
   a bumper reinforcement that is provided at a vehicle front-rear direction end portion of a vehicle so as to extend in a vehicle width direction, and that includes:
      a vertical wall disposed with a plate thickness direction in a vehicle front-rear direction, and
      a pair of horizontal walls provided respectively extending from both vehicle vertical direction end portions of the vertical wall toward a vehicle inner side, substantially along the vehicle front-rear direction;
   a left and right pair of side members that are respectively provided at the vehicle inner side of the bumper reinforcement so as to extend in the vehicle front-rear direction with leading ends of the side members fastened to the vertical wall of the bumper reinforcement; and
   fastening extensions that are provided at the respective leading ends of the side members, that project out toward a vehicle width direction outer side with respect to a respective side member, and that are fastened to at least one of the horizontal walls of the bumper reinforcement, wherein
   the left and right pair of side members each have a cross-section profile orthogonal to a side member length direction that is a closed cross-section formed by a side member outer panel disposed at the vehicle width direction outer side and a side member inner panel disposed at a vehicle width direction inner side,
   a bracket including the fastening extensions is attached to respective leading ends of the side members,
   the bracket comprises an attachment wall, a front fastening extension, and the fastening extension,
   the attachment wall is joined to the side members from the vehicle width direction outer side of the side members, and
   the front fastening extension is provided extending from the attachment wall toward the vehicle width direction outer side and is disposed with its plate thickness direction in the vehicle front-rear direction.

7. A joint structure of a bumper reinforcement and a side member, the joint structure comprising:

a bumper reinforcement that is provided at a vehicle front-rear direction end portion of a vehicle so as to extend in a vehicle width direction, and that includes:
 a vertical wall disposed with a plate thickness direction in a vehicle front-rear direction, and
 a pair of horizontal walls provided respectively extending from both vehicle vertical direction end portions of the vertical wall toward a vehicle inner side, substantially along the vehicle front-rear direction;
a left and right pair of side members that are respectively provided at the vehicle inner side of the bumper reinforcement so as to extend in the vehicle front-rear direction with leading ends of the side members fastened to the vertical wall of the bumper reinforcement; and
fastening extensions that are provided at the respective leading ends of the side members, that project out toward a vehicle width direction outer side with respect to a respective side member, and that are fastened to at least one of the horizontal walls of the bumper reinforcement,
wherein the left and right pair of side members each have a cross-section profile orthogonal to a side member length direction that is a closed cross-section formed by a side member outer panel disposed at the vehicle width direction outer side and a side member inner panel disposed at a vehicle width direction inner side, and
wherein the fastening extensions are each configured by an upper wall of the side member outer panel, and by an upper wall of the side member inner panel that overlaps with the upper wall of the side member outer panel.

8. The joint structure of the bumper reinforcement and the side member of claim 7, wherein a bracket including the fastening extensions is attached to respective leading ends of the side members.

9. The joint structure of the bumper reinforcement and the side member of claim 7, wherein the bumper reinforcement is divided into a plurality of sections disposed along a bumper reinforcement length direction.

10. The joint structure of the bumper reinforcement and the side member of claim 8, wherein:
 the bracket comprises an attachment wall, a front fastening extension, and the fastening extension,
 the attachment wall is joined to the side members from the vehicle width direction outer side of the side members, and
 the front fastening extension is provided extending from the attachment wall toward the vehicle width direction outer side and is disposed with its plate thickness direction in the vehicle front-rear direction.

* * * * *